(12) United States Patent
Ikuno (10) Patent No.: US 8,520,235 B2
(45) Date of Patent: Aug. 27, 2013

(54) SYSTEM AND METHOD FOR STORING IMAGE AND IMAGE PROCESSING APPARATUS, WHEREIN EACH OF A PLURALITY OF THE IMAGE PROCESSING APPARATUSES ENGAGED IN THE COLLABORATIVE IMAGE PROCESSING TERMINATES ITS OWN RESPECTIVE PORTION OF THE COLLABORATIVE IMAGE PROCESSING, AND WHEREIN A MASTER ONE OF THE INFORMATION PROCESSING APPARATUS CONTROLS WHICH OF THE IMAGE PROCESSING APPARATUSES TRANSMITS THE COLLABORATIVE RESULT DATA OF THE COLLABORATIVE IMAGE PROCESSING TO THE STORAGE UNIT

(75) Inventor: Takao Ikuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 12/367,206

(22) Filed: Feb. 6, 2009

(65) Prior Publication Data
US 2009/0201550 A1 Aug. 13, 2009

(30) Foreign Application Priority Data
Feb. 7, 2008 (JP) ................................. 2008-027804

(51) Int. Cl.
*G06F 3/12* (2006.01)
(52) U.S. Cl.
USPC ......................... 358/1.15; 358/1.16; 358/3.23

(58) Field of Classification Search
USPC ........................ 358/1.1–3.23; 707/664–673
See application file for complete search history.

(56) References Cited

U.S. PATENT DOCUMENTS

| | | | |
|---|---|---|---|
| 2001/0015828 A1* | 8/2001 | Miyamoto et al. | 358/474 |
| 2004/0136030 A1* | 7/2004 | Gassho | 358/1.15 |
| 2004/0145660 A1* | 7/2004 | Kusaka | 348/211.2 |
| 2005/0080330 A1* | 4/2005 | Masuzawa et al. | 600/407 |
| 2006/0106677 A1* | 5/2006 | Sawada et al. | 705/26 |

FOREIGN PATENT DOCUMENTS

JP 2006-293833 A 10/2006

\* cited by examiner

*Primary Examiner* — Benny Q Tieu
*Assistant Examiner* — Marcellus Augustin
(74) *Attorney, Agent, or Firm* — Canon U.S.A., Inc. IP Division (57) ABSTRACT

An image storage system includes a plurality of image processing apparatuses that execute image processing on image data in collaboration with one another; a storage unit that stores information on the image data; a transmitting unit provided in at least one of the plurality of image processing apparatuses and transmitting the information on the image data to the storage unit; an information acquisition unit that acquires apparatus information on the plurality of image processing apparatuses; and a determination unit that determines, from the plurality of image processing apparatuses, an image processing apparatus that transmits the information on the image data, which is processed by the plurality of image processing apparatuses in collaboration with one another, to the storage unit based on the acquired apparatus information.

20 Claims, 10 Drawing Sheets

SYSTEM AND METHOD FOR STORING IMAGE AND IMAGE PROCESSING APPARATUS, WHEREIN EACH OF A PLURALITY OF THE IMAGE PROCESSING APPARATUSES ENGAGED IN THE COLLABORATIVE IMAGE PROCESSING TERMINATES ITS OWN RESPECTIVE PORTION OF THE COLLABORATIVE IMAGE PROCESSING, AND WHEREIN A MASTER ONE OF THE INFORMATION PROCESSING APPARATUS CONTROLS WHICH OF THE IMAGE PROCESSING APPARATUSES TRANSMITS THE COLLABORATIVE RESULT DATA OF THE COLLABORATIVE IMAGE PROCESSING TO THE STORAGE UNIT

BACKGROUND OF THE INVENTION

1. Field of the Invention

The present invention relates to a system and a method for storing image data by executing a collaborative operation with a plurality of image processing apparatuses and to image processing apparatuses.

2. Description of the Related Art

Recent improvement in function and the widespread use of image processing apparatuses have facilitated copying of documents and sending of electronic data. Although these functions are very convenient, copying of documents and sending of electronic data may cause leakage of confidential information.

Japanese Unexamined Patent Application Publication No. 2006-293833 discusses a conventional method of coping with such a problem, wherein a server storage function is provided in an image processing apparatus, which temporarily stores input image data in a memory in the apparatus and uploads processed image data to a server to store all the processed image data in the server. Thus, in the event of leakage of confidential information, a user can trace which apparatus processed the information by referring to the data in the server.

Recent image processing apparatuses are also capable of collaborative processing by a plurality of devices. This collaborative processing inputs image data using a first device and processes the image data using a second device. Thus, collaborative processing can be executed by requesting the second device to execute an image processing function that the first device has not.

However, the above-described related-art image storage system has the following problems. In the case where the collaborative processing is performed by the first multifunction device and the second multifunction device, the same image data is stored in both devices. To find the transmission source from output image data, there is no need to store the data from both multifunction devices, which wastes much image storage memory of the server.

The server storage function stores input documents in the server. Therefore, if the appearance of a stored image is significantly changed by the process of 2in1 layout or stamping, it becomes difficult to search for the same image if a problem, such as leakage of information, occurs later. Thus, such image processing after server storage processing has been inhibited.

SUMMARY OF THE INVENTION

Accordingly, the present invention provides an image storage system that allows, in collaborative operation, even an apparatus having no storage function to execute storage processing if another apparatus has a storage function, thus allowing collaborative operation.

The present invention further provides an image storage system in which, in collaborative operation, duplicated storage processing by multiple apparatuses is prevented.

The present invention further provides an image storage system capable of storing traceable image data without inhibiting image processing by a subsequent apparatus.

According to a first aspect of the present invention, an image storage system includes a plurality of image processing apparatuses that execute image processing on image data in collaboration with one another; a storage unit that stores information on the image data; a transmitting unit provided in at least one of the plurality of image processing apparatuses and transmitting the information on the image data to the storage unit; an information acquisition unit that acquires apparatus information on the plurality of image processing apparatuses; and a determination unit that determines, from the plurality of image processing apparatuses, an image processing apparatus that transmits the information on the image data, which is processed by the plurality of image processing apparatuses in collaboration with one another, to the storage unit based on the acquired apparatus information.

According to a second aspect of the present invention, an image processing apparatus executes image processing on image data in collaboration with another image processing apparatus. At least the former includes a receiving unit that receives apparatus information on the other image processing apparatus; a transmitting unit that transmits information on the image data, on which image processing is executed, to the storage unit; and a determination unit that determines whether the information on the image data, on which image processing is executed in collaboration with the other image processing apparatus, is to be transmitted to the storage unit by its own transmitting unit or rather by the other image processing apparatus.

According to a third aspect of the present invention, an image processing apparatus executes image processing on image data in collaboration with another image processing apparatus. At least the former includes a transmitting unit that transmits apparatus information on the image processing apparatus to the other image processing apparatus; a receiving unit that receives, from the other image processing apparatus, a notification on processing of transmitting the image data to a storage unit; and a determination unit that determines whether to transmit the image data to the storage unit based on the notification that the receiving unit has received.

Further features of the present invention will be apparent from the following description of exemplary embodiments with reference to the attached drawings.

DESCRIPTION OF THE EMBODIMENTS

An image storage system, an image processing apparatus, an image storage method, a program, and a storage medium according to embodiments of the present invention will be described with reference to the drawings. The image storage system may be applied to a server storage system in which a plurality of multifunction devices and a server are connected over a network. Here, the plurality of multifunction devices correspond to a plurality of image processing apparatuses, and the server corresponds to a storage unit.

Figure 1:
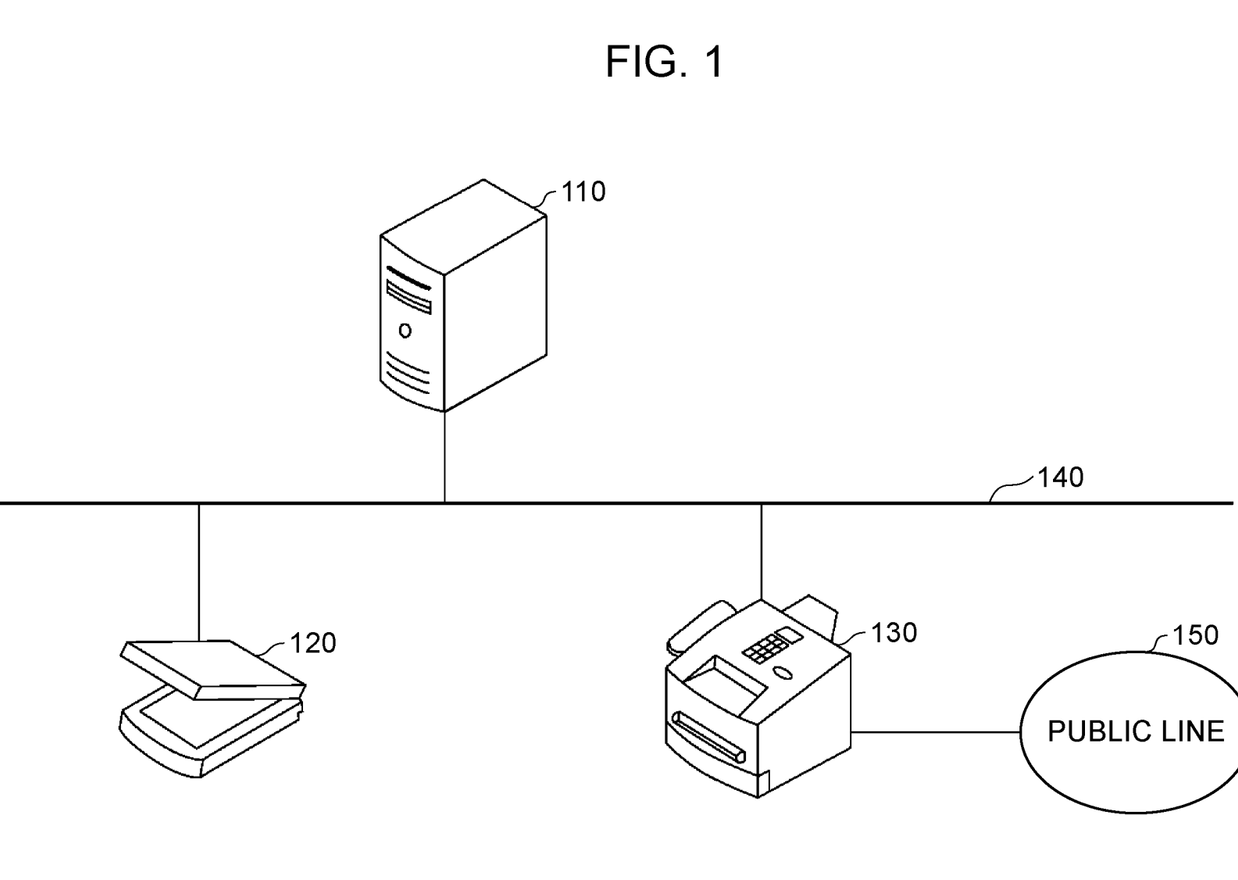
FIG. 1 is a diagram showing the schematic configuration of a server storage system.

FIG. 1 is a diagram showing the schematic configuration of a server storage system according to an embodiment. The server storage system includes a first multifunction device 120, a second multifunction device 130, and a server 110 which are connected together over a local area network (LAN) 140. Other multifunction devices other than the first and second multifunction devices and information processing apparatuses may be connected to the LAN 140.

The first multifunction device 120 and the second multifunction device 130, which are one form of an image processing apparatus, have multiple functions including copying and printing. In this embodiment, suppose that the second multifunction device 130 has a facsimile function, and the first multifunction device 120 has no facsimile function.

The second multifunction device 130 can be connected to a public line 150 and can perform facsimile transmission and reception by communication with the public line 150. The first multifunction device 120 and the second multifunction device 130 can execute a job on a standalone basis. For example, a copy function of scanning a document and printing it by itself corresponds to standalone execution of a job.

The first multifunction device 120 and the second multifunction device 130 can execute a function in collaboration with each other. In this embodiment, such a function is referred to as a collaborative function and the operation of the first multifunction device 120 and the second multifunction device 130 for achieving the collaborative function is referred to as a collaborative operation.

One example of the collaborative function is "collaborative fax transmission". The first multifunction device 120 having no facsimile function sends image data to be faxed and information necessary for facsimile transmission (for example, the phone number of a destination) to the second multifunction device 130. The second multifunction device 130 faxes the image data in accordance with information, such as the image data, received from the first multifunction device 120 using its own facsimile function. Thus, the collaborative fax transmission function is achieved. The use of this collaborative fax transmission function allows a multifunction device having no facsimile transmission function to operate as if it is a multifunction device having a facsimile transmission function.

Another example of the collaborative function is "remote copying". The first multifunction device 120 having no printer sends image data to be printed and information necessary for achieving a copying function (for example, the number of copies and setting of two-sided printing) to the second multifunction device 130. The second multifunction device 130 prints the image data in accordance with information, such as the image data, received from the first multifunction device 120, using its own print function. The use of the remote copying function allows a multifunction device having no printer to operate as if it is a multifunction device having a print function.

The server 110 collects and stores information on jobs that the first multifunction device 120 and the second multifunction device 130 have executed. Examples of the job information include job history information, such as image data used for executing jobs, date at which jobs are executed, and information that identifies a user who gives an instruction to execute jobs. In the server storage system of this embodiment, the server 110 stores information on jobs that image processing apparatuses, such as the first multifunction device 120 and the second multifunction device 130, have executed. Accordingly, if leakage of confidential information is detected, the server storage system can find out when, where, by whom, and with which image processing apparatus the leaked image was outputted, on the basis of the information stored in the server 110.

Figure 2:
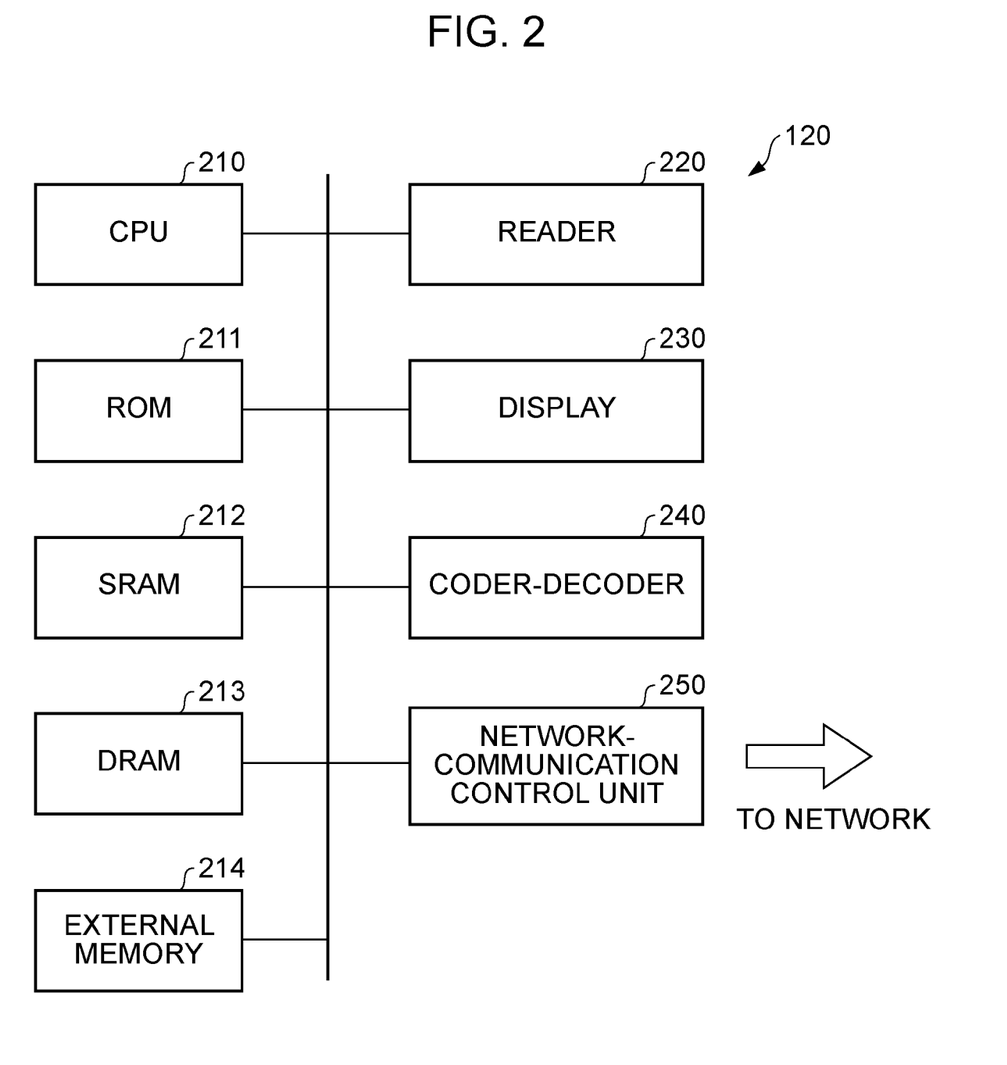
FIG. 2 is a block diagram showing the hardware structure of a first multifunction device.

FIG. 2 is a block diagram showing the hardware structure of the first multifunction device 120. The first multifunction device 120 includes a central processing unit (CPU) 210, a ROM 211, a SRAM 212, a DRAM 213, an external memory device 214, a reader 220, a display 230, a coder-decoder 240, and a network-communication control unit 250.

The CPU 210 is a system controller and controls the whole apparatus. The ROM 211 stores control programs executed by the CPU 210. The SRAM 212 stores set values, device management data, and so on, which are registered by an operator, and has various work buffers and so on. The DRAM 213 stores program control variables and so on.

The external memory device (simply referred to as an external memory) 214 is a temporary storage memory for temporarily storing history information to be stored in the server 110. The reader 220 is a device that reads image data and converts it to binary data. Even a device having no reader can also serve as the image processing apparatus of the present invention. The display 230 is a user interface and displays information in the device.

The coder-decoder (CODEC) 240 encodes and decodes image data handled by the communication control unit (network-communication control unit 250). The network-communication control unit 250 serves as an interface to the network line (LAN) 140. This embodiment takes a multifunction device, such as a scanner having no facsimile transmitting section and a recording portion as an example of the first multifunction device. This single device can execute only a limited number of functions that can be executed by this device itself.

Figure 3:
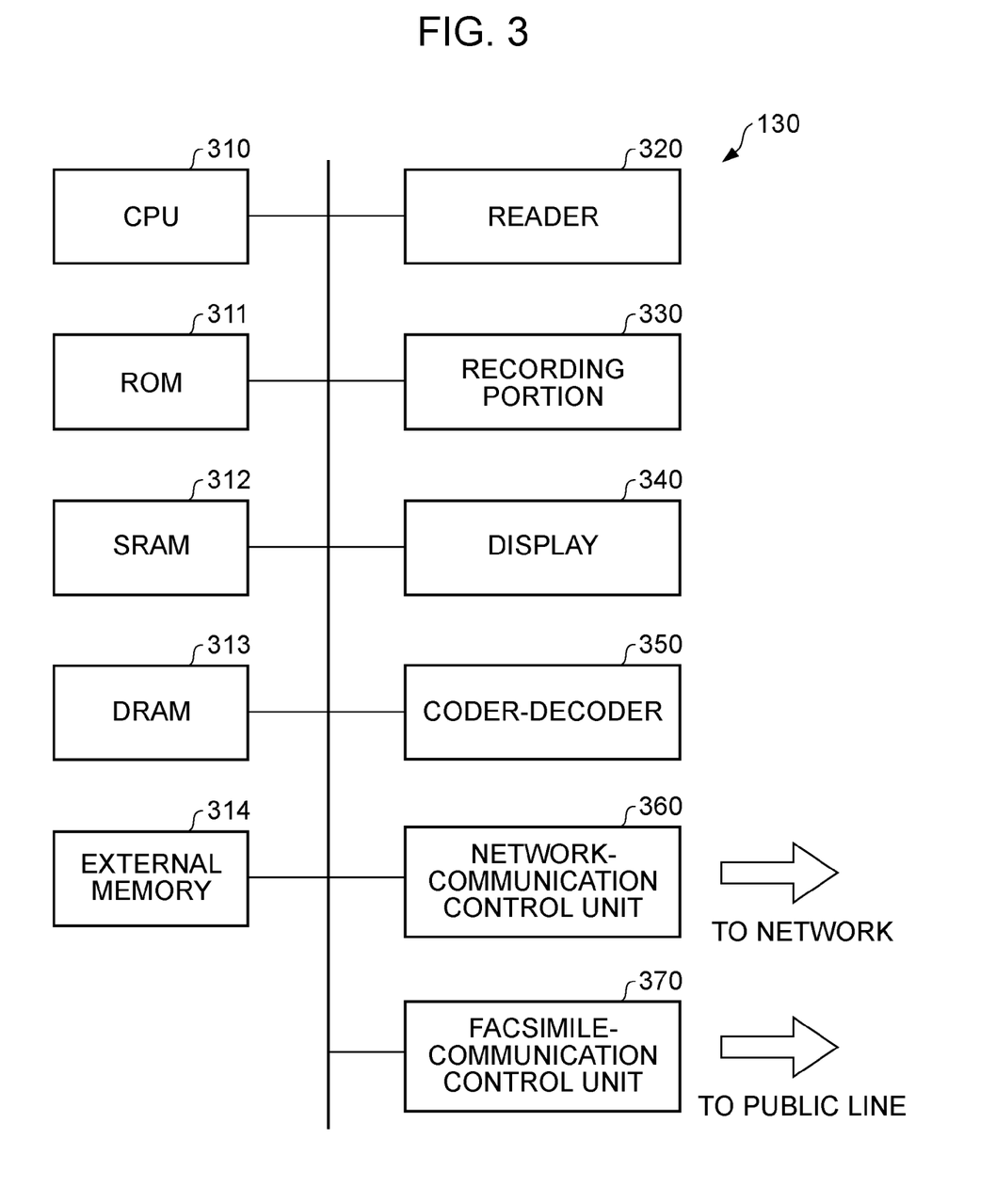
FIG. 3 is a block diagram showing the hardware structure of a second multifunction device.

FIG. 3 is a block diagram showing the hardware structure of the second multifunction device 130. The second multifunction device 130 includes a CPU 310, a ROM 311, a SRAM 312, a DRAM 313, an external memory device 314, a reader 320, a recording portion 330, a display 340, a coder-decoder 350, a network-communication control unit 360, and a facsimile-communication control unit 370.

The CPU 310 is a system controller and controls the whole apparatus. The ROM 311 stores control programs executed by the CPU 310. The SRAM 312 stores set values, device management data, and so on which are registered by an operator, and has various work buffers and so on. The DRAM 313 stores program control variables and so on. The external memory device (simply referred to as an external memory) 314 is a temporary storage memory for temporarily storing history information to be stored in the server 110.

The reader 320 is a device that reads image data and converts it to binary data. Even a device having no reader can also serve as the image processing apparatus of the present invention. The recording portion 330 is a unit that outputs image data to recording paper. Even a device having no recording portion can also serve as the image processing apparatus of the present invention. The display 340 is a user interface and displays information in the device. The coder-decoder (CODEC) 350 encodes and decodes image data handled by the communication control units (the network-communication control unit 360 and the facsimile-communication control unit 370).

The network-communication control unit 360 serves as an interface to a network line. The facsimile-communication control unit 370 is an interface to a telephone line. Even a device having no facsimile-communication control unit can also serve as the image processing apparatus of the present invention. This embodiment takes a multifunction device having various functions, such as copying, facsimile, and sending of mail, by way of example. The use of the functions of this device allows the first multifunction device 120 to achieve much more functions.

Server Storage Processing

Figure 4:
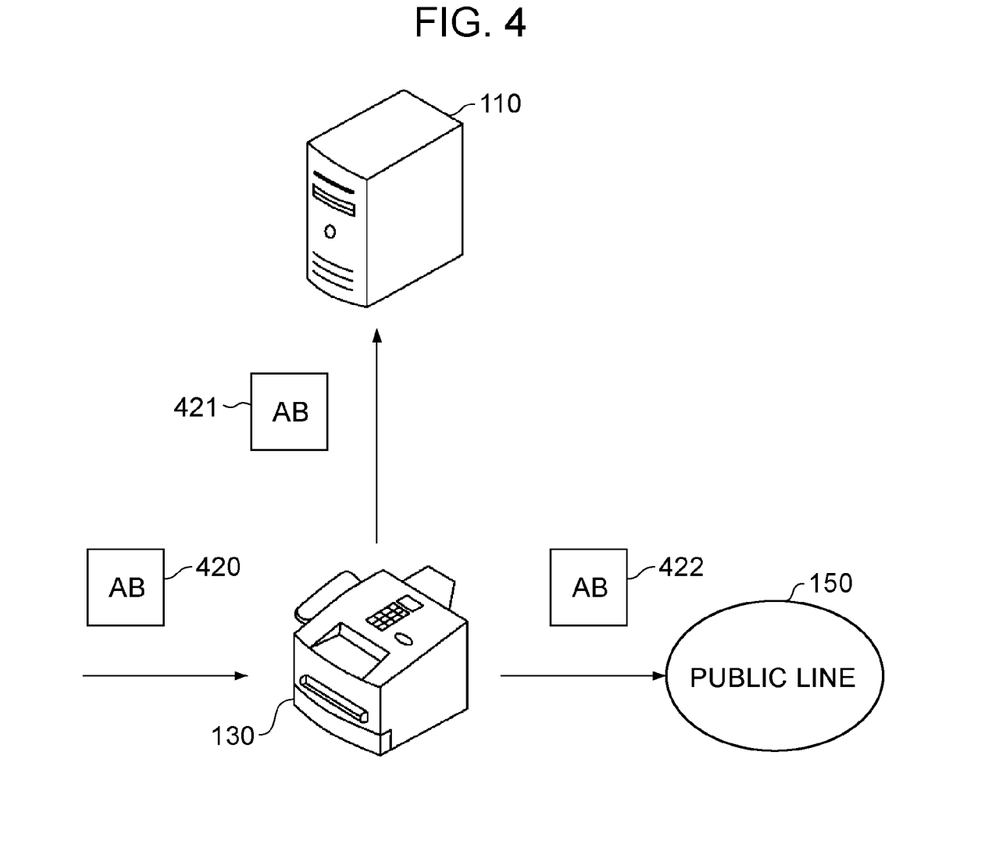
FIG. 4 is a diagram showing the outline of server storage processing.

FIG. 4 is a diagram showing the outline of the server storage processing. In the server storage system, the second multifunction device 130 temporarily stores a history including image data used for an executed job, job settings, information that identifies a user who gives an instruction to execute the job in the external memory 314 in the second multifunction device 130 and sends them to the server 110 together. FIG. 4 shows a case in which facsimile transmission is performed by the second multifunction device 130. The second multifunction device 130 receives an instruction to read a document 420 from a user, generates image data 422, and faxes it to the public line 150. The second multifunction device 130 temporarily stores image data 421, processed at that time, in the external memory 314 of the main body, and uploads it to the server 110 in one go after a lapse of a fixed period after the transmission.

If the administrator determines, on the basis of information from a recipient who received the facsimile and by viewing an image sent from the multifunction device, that confidential information has been sent, the user can trace a multifunction device that generated the data by searching for the data archived in the server.

Collaborative Operation

Figure 5:
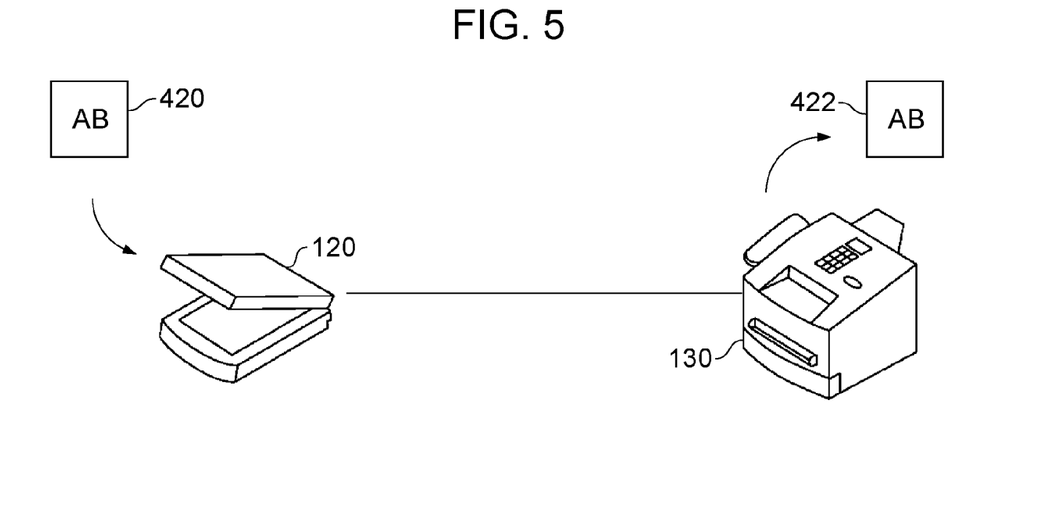
FIG. 5 is a diagram showing the outline of collaborative processing.

As described above, the collaborative operation allows a plurality of multifunction devices to perform a function in concert which they may not be able to perform individually. FIG. 5 is a diagram showing the outline of collaborative facsimile processing by a plurality of multifunction devices.

In this embodiment, since the first multifunction device 120 has no facsimile transmission function, the first multifunction device 120 requests the second multifunction device 130 to perform facsimile transmission. At that time, the first multifunction device 120 notifies the second multifunction device 130 of information necessary for facsimile transmission, such as a telephone number.

Since the second multifunction device 130 has a facsimile transmission function, it can perform facsimile transmission. Thus, a user who uses the first multifunction device 120 can use the first multifunction device 120 as if it has the facsimile transmission function.

An example of how the server storage system in executing such collaborative operation will be shown below. The server storage system requires to store information that can identify a transmission source from image data output from the system. Therefore, if image data processed by the collaborative operation and history information cannot be stored in the server storage system, jobs must not be executed. Moreover, it is sufficient only to be able to identify the transmission source of the image data; therefore, there is no need to store the image data and history data of all the multifunction devices related to the collaborative operation. To use the memory capacity of the server efficiently so as not to fail in storing data in the server, device information on the multifunction devices is exchanged at the start of communication for collaborative operation.

Figure 6:
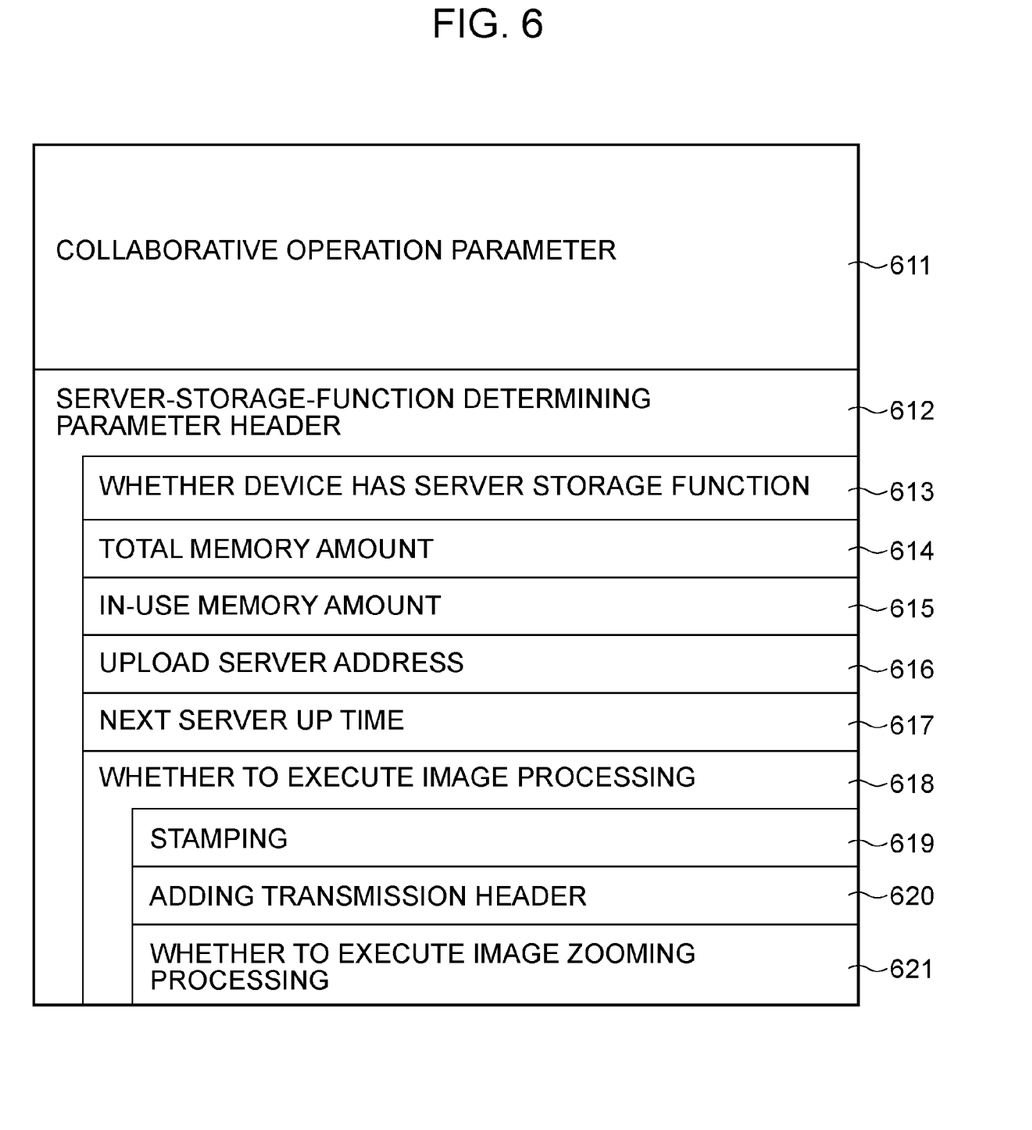
FIG. 6 is a table showing data (device information) exchanged during transmission in collaborative operation.

FIG. 6 is a table showing data (device information) exchanged during transmission in collaborative operation. The exchange data (device information) is, for the first multifunction device 120, stored in the SRAM 212, and for the second multifunction device 130, stored in the SRAM 312.

In a first case of collaborative operation communication, only a collaborative operation parameter 611 was exchanged. Consider a facsimile collaborative operation in which the first multifunction device 120 performs reading and the second multifunction device 130 performs facsimile transmission by way of example. In this case, the collaborative operation parameter 611 serves as a data area in which information necessary for collaborative operation, such as a telephone number and the length and width of image data, is stored.

In a second case of collaborative operation communication of this embodiment, the following data is added. A server-storage-function determining parameter header 612 is used to determine which multifunction device is used for server storage processing.

The server-storage-function determining parameter header 612 has a flag 613 indicating whether the device has a server storage function and a total memory capacity 614 necessary for measuring the remaining memory of the device. The parameter header 612 further has an in-use memory amount 615 necessary for measuring its own remaining memory capacity, and address information 616 of an upload server used by the server storage function. The server address information 616 corresponds to identifying information that identifies a server that is a destination storage unit. The parameter header 612 still further has time (next server upload time) 617 to upload server storage data, which is temporarily stored in the device, to the server in a lump and a flag 618 indicating whether to execute image processing by the device.

The flag 618 is a parameter only for a subsequent multifunction device of the collaborative devices. If this parameter is ON, that is, image processing is performed by the device itself, the details of image processing to be performed is expressed as data. In this example, notifications of stamping 619, adding a transmission header 620, and whether to execute image zooming processing 621 are given.

The first multifunction device 120 and the second multifunction device 130 that perform collaborative operation in the above-described data format exchange their individual device information. In this embodiment, the first multifunction device 120 receives this information from the second multifunction device 130 and performs collaborative operation.

Server Storage Processing in Collaborative Operation

Figure 7:
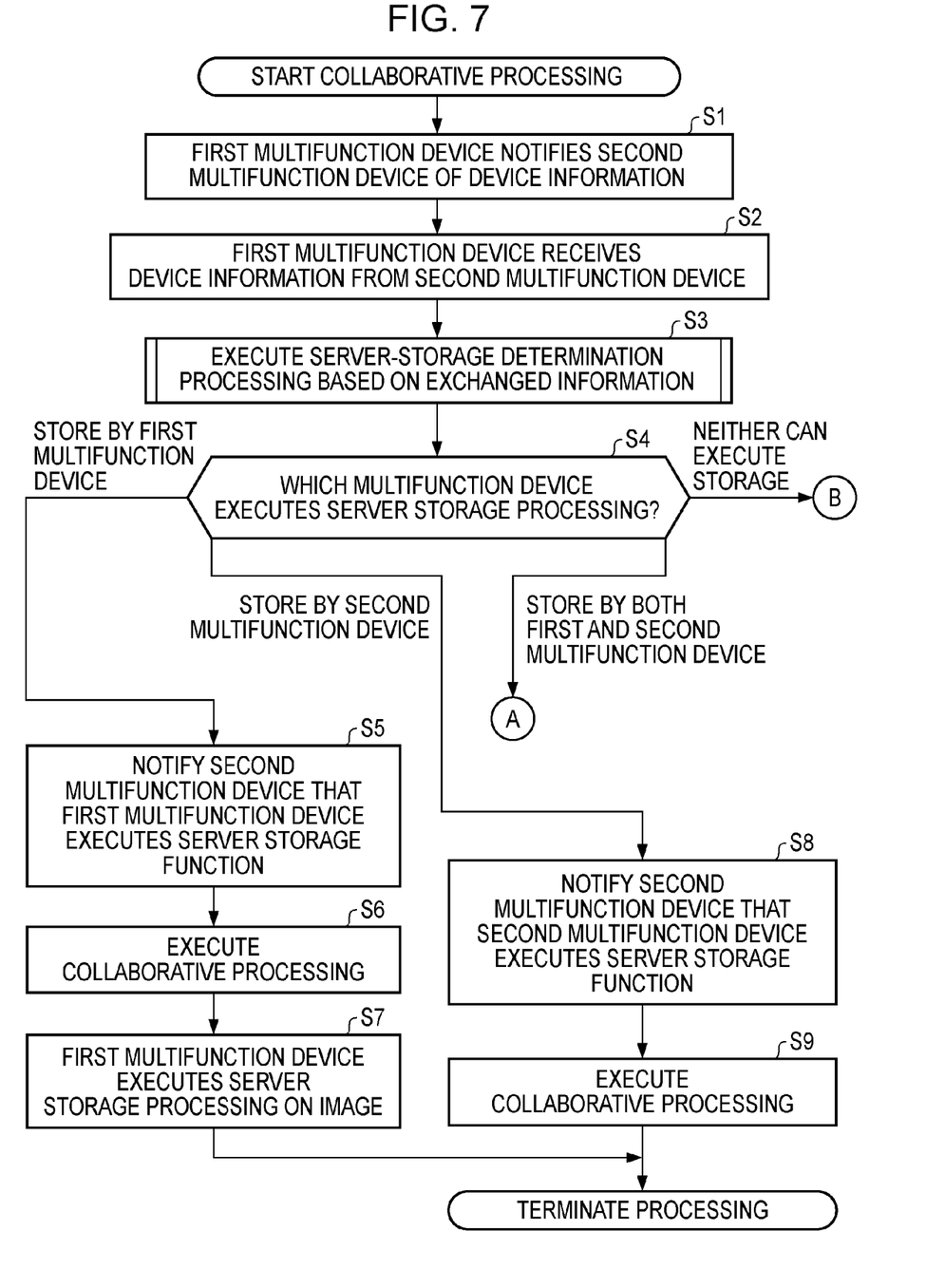
FIG. 7 is a flowchart showing the operation procedure of the first multifunction device.
Figure 8:
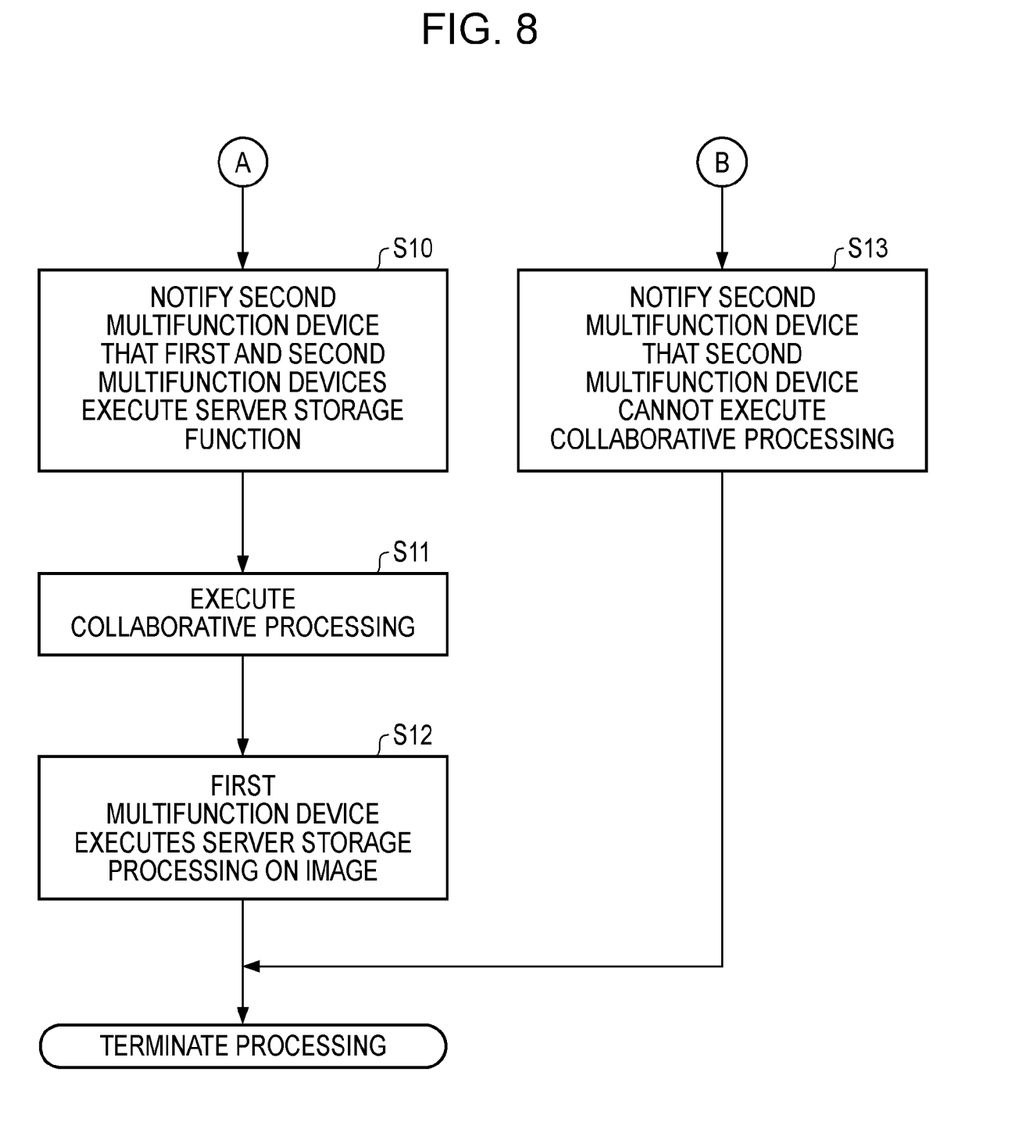
FIG. 8 is a flowchart showing the operation procedure of the first multifunction device following FIG. 7.

FIGS. 7 and 8 are flowcharts showing the operational procedure of the first multifunction device 120. This processing program is stored in the ROM 211 and is executed by the CPU 210. When collaborative operation is started between the first multifunction device 120 and the second multifunction device 130, the first multifunction device 120 notifies the second multifunction device 130 of the device information on the first multifunction device 120 at the beginning of communication through the network-communication control unit 250 (step S1). The device information exchanged at that time is shown in FIG. 6.

The first multifunction device 120 receives device information from the second multifunction device 130 (step S2) (device-information acquisition unit). This device information is also shown in FIG. 6. Thus, information is exchanged between the first multifunction device 120 and the second multifunction device 130 by the processes in steps S1 and S2.

Furthermore, the first multifunction device 120 analyzes the server-storage-function determining parameter header 612 on the basis of the device information acquired in step S2 and performs server-storage determination processing (step S3). As a result of the server-storage determination processing, the first multifunction device 120 determines which multifunction device is to perform server storage processing (step S4). If it is determined that server storage processing is to be performed only by the first multifunction device 120, then the first multifunction device 120 notifies the second multifunction device 130 that the first multifunction device 120 executes the server storage function (step S5). This notification is, in other words, given to prevent the second multifunction device 130 from performing server storage processing. The second multifunction device 130, which has received this notification, can thus recognize that the second multifunction device 130 may not perform server storage processing.

The first multifunction device 120 executes actual collaborative processing (step S6). The first multifunction device 120 executes server storage processing by itself after collaborative processing (step S7). Specifically, the first multifunction device 120 temporarily stores input image data and history information in the external memory 214. The first multifunction device 120 sends the stored information to the server 110 through the network-communication control unit 250 at a predetermined time. After this, the first multifunction device 120 terminates the collaborative operation.

On the other hand, if it is determined in step S4 that the second multifunction device 130 is to perform server storage processing, then the first multifunction device 120 notifies the second multifunction device 130 that the second multifunction device 130 is to execute server storage processing (step S8). Then, the first multifunction device 120 executes actual collaborative processing (step S9). After this, the first multifunction device 120 terminates the collaborative operation.

On the other hand, if it is determined in step S4 that both the first multifunction device 120 and the second multifunction device 130 are to perform server storage processing, then the first multifunction device 120 notifies the second multifunction device 130 that both of the devices are to execute server storage processing (step S10). Then, the first multifunction device 120 executes actual collaborative processing (step S11). The first multifunction device 120 executes the server storage processing by the first multifunction device 120 after the collaborative processing (step S12). After this, the first multifunction device 120 terminates the collaborative operation.

On the other hand, if it is determined in step S4 that neither of the multifunction devices can execute server storage processing, then the first multifunction device 120 notifies the second multifunction device 130 that execution of the job cannot be continued because job history information cannot be held (step S13). After this, the first multifunction device 120 terminates the collaborative operation.

Figure 9:
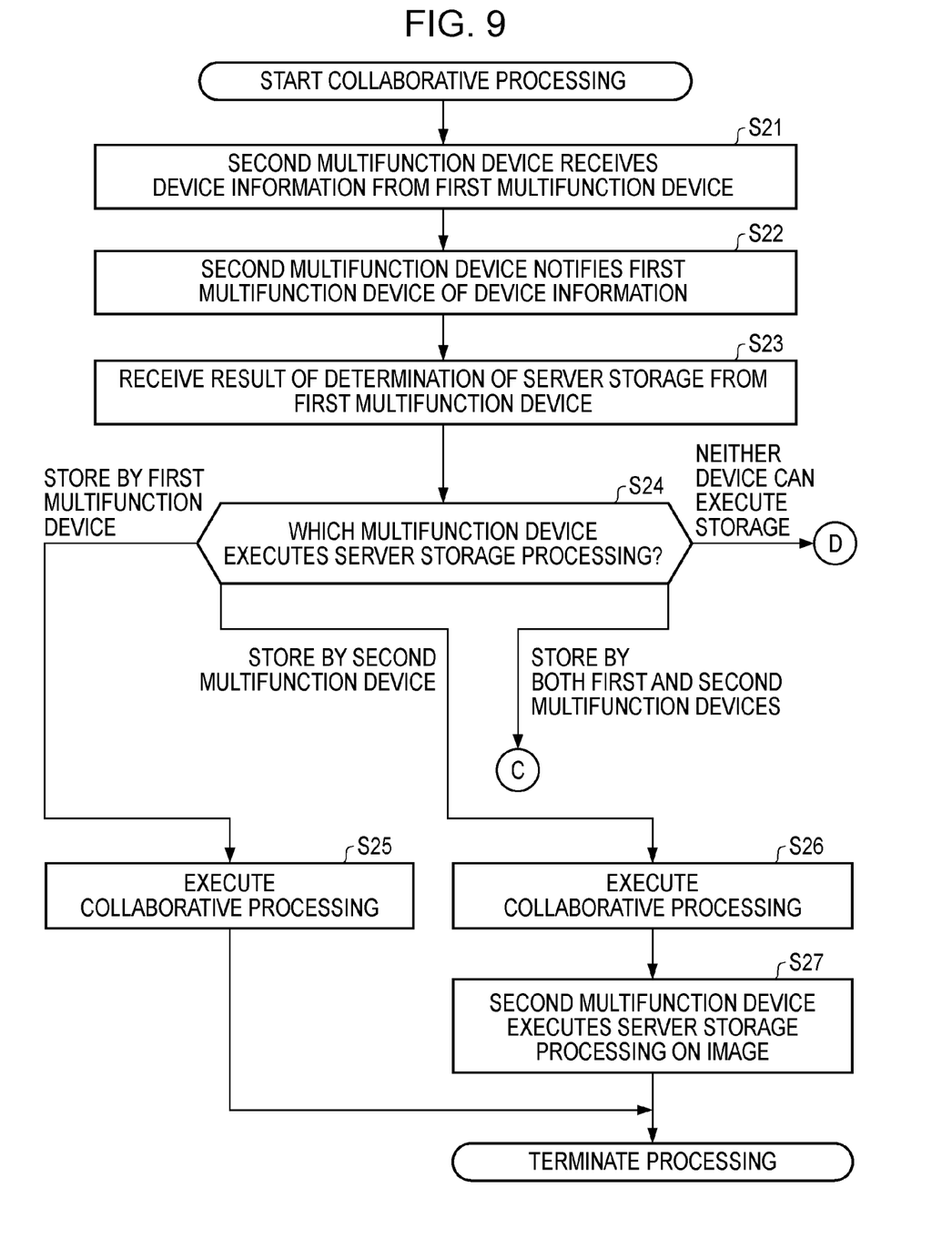
FIG. 9 is a flowchart showing the operation procedure of the second multifunction device.
Figure 10:
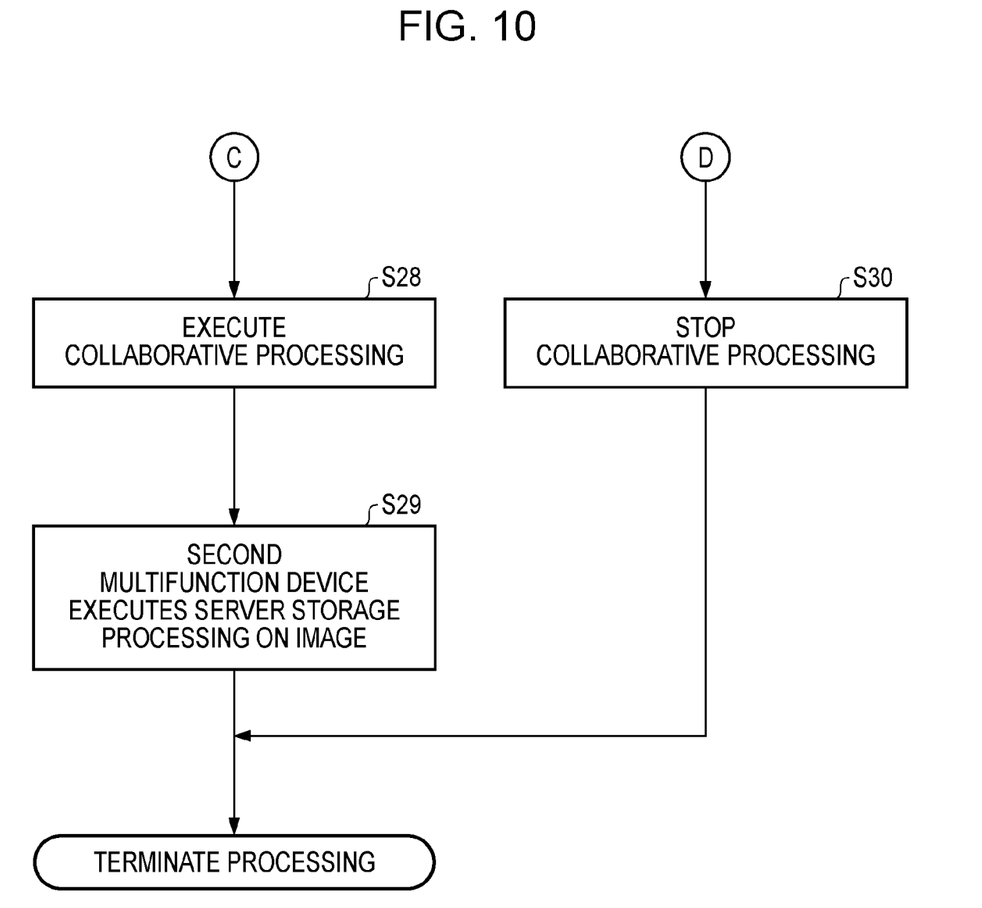
FIG. 10 is a flowchart showing the operation procedure of the second multifunction device following FIG. 9.

FIGS. 9 and 10 are flowcharts showing the operational procedure of the second multifunction device 130. This processing program is stored in the ROM 311 and is executed by the CPU 310. When collaborative operation is started between the first multifunction device 120 and the second multifunction device 130, the second multifunction device 130 receives device information on the first multifunction device 120 at the beginning of communication through the network-communication control unit 360 (step S21). The device information exchanged at that time is shown in FIG. 6.

The second multifunction device 130 notifies the first multifunction device 120 of device information on the second multifunction device 130 (step S22). This device information is also shown in FIG. 6.

Here, the first multifunction device 120, in step S3, analyzes the server-storage-function determining parameter header 612 on the basis of the exchanged device information and determines which multifunction device is to execute server storage processing. The second multifunction device 130 receives the result of determination of the server storage processing, which is sent from the first multifunction device 120 (step S23). The second multifunction device 130 determines from the result which multifunction device is to execute server storage processing (step S24).

If it is determined from the result that server storage processing is to be performed only by the first multifunction device 120, then the second multifunction device 130 executes actual collaborative processing (step S25). Since the second multifunction device 130 does not execute server storage processing, the second multifunction device 130 terminates the collaborative operation.

On the other hand, if it is determined in step S24 that the second multifunction device 130 is to perform server storage processing, then the second multifunction device 130 executes actual collaborative processing (step S26). The second multifunction device 130 executes server storage processing after the collaborative processing (step S27). After this, the second multifunction device 130 terminates the collaborative operation.

On the other hand, if it is determined in step S24 that both the first multifunction device 120 and the second multifunction device 130 are to perform server storage processing, then the second multifunction device 130 executes actual collaborative processing (step S28). The second multifunction device 130 executes server storage processing after the collaborative processing (step S29). After this, the second multifunction device 130 terminates the collaborative operation.

On the other hand, if it is determined that neither of the multifunction devices can execute server storage processing, the second multifunction device 130 stops the collaborative operation because job history information cannot be held (step S30). After this, the second multifunction device 130 terminates the collaborative operation.

Thus, the image storage system of this embodiment allows an appropriate multifunction device to execute server storage processing by exchanging device information by collaborative operation.

Server Storage Determination

Figure 11:
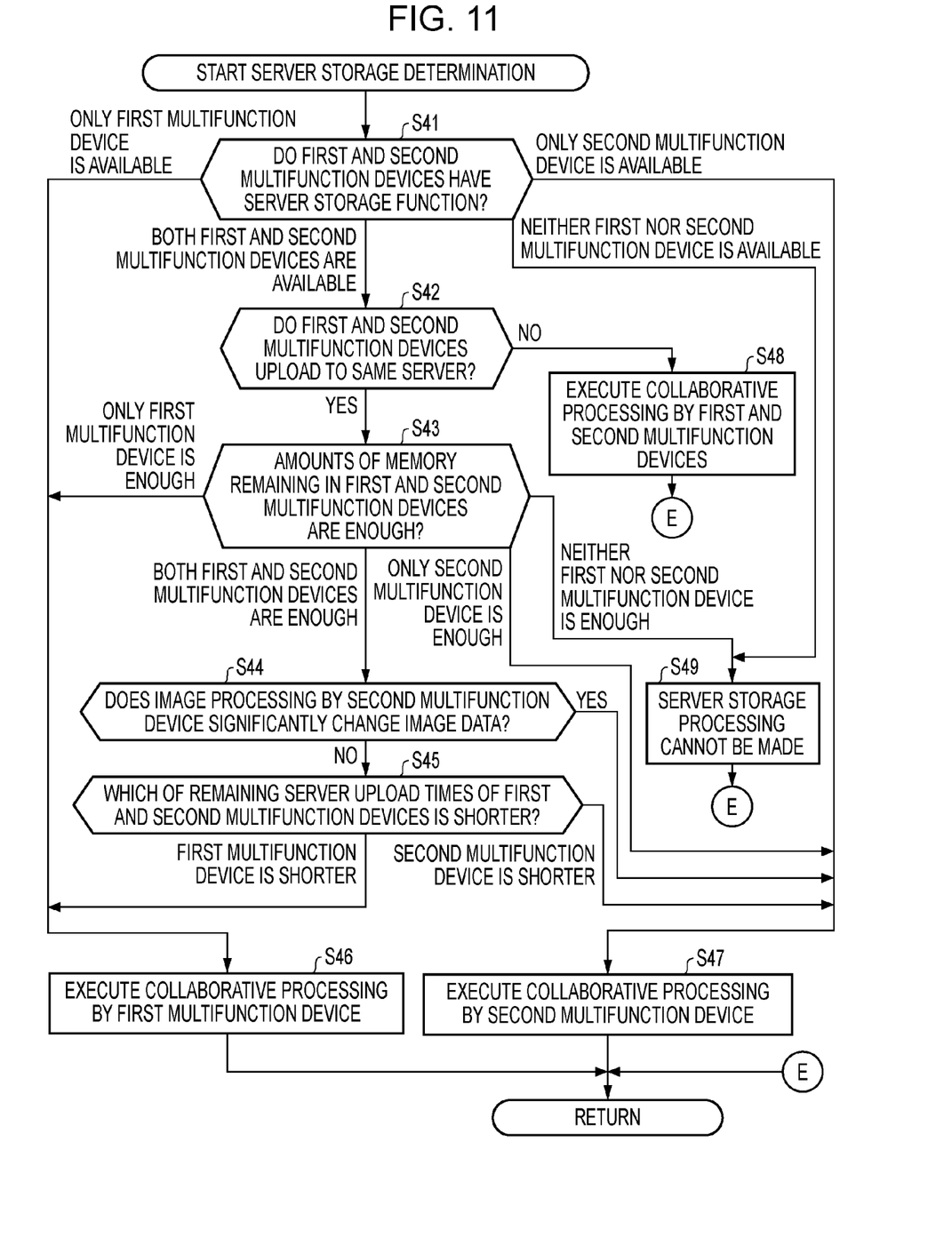
FIG. 11 is a flowchart showing the server-storage-determination processing procedure in step S3 of the first multifunction device.

FIG. 11 is a flowchart showing the procedure of the server-storage-determination processing of the first multifunction device 120 in step S3. First, the first multifunction device 120 inquires the exchanged device information to determine whether the first multifunction device 120 and the second multifunction device 130 have a server-storage processing function (step S41).

Here, if only the first multifunction device 120 is capable of the server storage function, then the first multifunction device 120 makes a determination to execute it by the first multifunction device 120 (step S46) because the first multifunction device 120 has no choice but to execute the function by itself. Likewise, if only the second multifunction device 130 is capable of the server storage function, then the first multifunction device 120 makes a determination to execute it by the second multifunction device 130 (step S47). If both the first multifunction device 120 and the second multifunction device 130 have no server storage function, job image data and history information cannot be sent to the server 110. Therefore, the first multifunction device 120 makes a determination of "server storage processing cannot be executed" (step S49). After the processes in steps S46, S47, and S49, the first multifunction device 120 returns to the main processing.

If both the first multifunction device 120 and the second multifunction device 130 have the server storage processing function, the server storage processing can be executed by either of them, and the first multifunction device 120 moves to the process in step S42 which corresponds to another criterion.

The first multifunction device 120 determines whether the first multifunction device 120 and the second multifunction device 130 upload (transfer) data to the same server (step S42). If the upload server differs between the first multifunction device 120 and the second multifunction device 130 (between image processing apparatuses), the first multifunction device 120 makes a determination that both the first multifunction device 120 and the second multifunction device 130 execute server storage processing because job image data and history information need to be stored in the individual servers (step S48). After this, the first multifunction device 120 returns to the main processing.

On the other hand, if the first and second multifunction devices 120 and 130 upload data to the same server, both multifunction devices 120 and 130 can execute server storage processing, and the first multifunction device 120 moves to the process in step S43 which corresponds to another condition.

The first multifunction device 120 checks the remaining memory capacities of the first multifunction device 120 and the second multifunction device 130 (step S43). If only the first multifunction device 120 has enough remaining capacity, that is, if the remaining capacity of the external memory 214 is enough, then the first multifunction device 120 makes a determination to perform server storage processing by the first multifunction device 120 (step S46). In contrast, if only the second multifunction device 130 has enough remaining capacity, that is, if the remaining capacity of the external memory 314 is enough, then the first multifunction device 120 makes a determination to perform server storage processing by the second multifunction device 130 (step S47). If neither of the first multifunction device 120 and the second multifunction device 130 has enough remaining capacity of the external memories 214 and 314, then the first multifunction device 120 cannot send job image data and history information to the server 110. In this case, the first multifunction device 120 makes the determination that "server storage processing cannot be executed" (step S49).

If both the first multifunction device 120 and the second multifunction device 130 have enough remaining capacity of the external memory 214, both the first and second multifunction devices 120 and 130 can execute server storage processing, and the first multifunction device 120 moves to the processing in step S44 which corresponds to another criterion.

The first multifunction device 120 determines whether the processing of image data by the second multifunction device 130 significantly changes the appearance of the image data (step S44). If the second multifunction device 130 significantly changes the image, it becomes difficult to identify the transmission source from the output image even if the first multifunction device 120 executes server storage processing. Therefore, it is desirable that the second multifunction device 130 execute server storage processing. Accordingly, if the image is changed by the image processing by the second multifunction device 130, the first multifunction device 120 makes a determination to execute server storage processing by the second multifunction device 130 (step S47).

If the image is not significantly changed by the image processing by the second multifunction device 130, both multifunction devices 120 and 130 can execute server storage processing, and the first multifunction device 120 moves to the processing in step S45 which corresponds to another condition.

The first multifunction device 120 determines which of the first multifunction device 120 and the second multifunction device 130 takes less time to upload data to the server 110 (step S45). Since it is desirable that the time during which the respective external memories 214 and 314 of the first and second multifunction devices 120 and 130 are consumed be short, server storage processing is executed by a multifunction device that takes less time to upload to the server next time.

In other words, if the first multifunction device 120 takes less time to upload to the server, the first multifunction device 120 makes a determination to execute server storage processing by itself (step S46). In contrast, if the second multifunction device 130 takes less time to uploading to the server, the first multifunction device 120 makes a determination to execute server storage processing by the second multifunction device 130 (step S47).

Thus, the first multifunction device 120 determines which multifunction device is better to execute server storage processing by comparing the device information on the second multifunction device 130 and the device information of the first multifunction device 120.

The image storage system of this embodiment allows, in collaborative operation, even an apparatus having no storage function to execute storage processing if another apparatus has a server storage function, thus allowing collaborative processing. Moreover, in collaborative operation, the system prevents the apparatuses from performing duplicated server storage processing. Thus, it is sufficient only to be able to identify the transmission source of image data; therefore, there is no need to store the image data and history data of all the image processing apparatuses related to the collaborative operation. Accordingly, the memory capacity of the server can be used efficiently. Moreover, exchanging device information at the start of communication can prevent server storage processing from ending in failure. Furthermore, this image storage system allows collaborative operation without losing image data stored (accumulated) in another server. In case the memory is full, this image storage system causes another device to execute server storage processing, thereby reducing the frequency of situation in which jobs cannot be generated. Moreover, this image storage system can reduce a time during which the memory in the device is consumed, thereby reducing the frequency of occurrence of a memory full error. This image storage system can store traceable image data without inhibiting image processing by a subsequent device.

The present invention is not limited to the configuration of the above embodiment.

For example, the above embodiment shows a case in which a multifunction device (MFP) having a print function, a copying function, a scanner function and so on is used as an image processing apparatus. Alternatively, it may be a scanner, a facsimile machine, or a printer having a single function.

Although the above embodiment shows a case in which collaborative operation is performed by two multifunction devices as image processing apparatuses, collaborative operation may be performed by three or more image processing apparatuses, to which the invention can also be applied.

The present invention may execute the following processing. That is processing of providing a storage medium that stores program code for software that implements the functions of the above embodiment to a system or an apparatus and reading the program code stored in the storage medium by the computer (or the CPU or a micro-processor unit (MPU)) of the system or the apparatus.

In this case, the program code itself that is read from the storage medium implements the functions of the above embodiment, and the program code and the storage medium that stores the program code constitute another embodiment of the present invention.

Examples of the storage medium for providing the program code include a floppy (a trademark) disk, a hard disk, a magneto-optical disk, a CD-ROM, a CD-R, a CD-RW, a DVD-ROM, a DVD-RAM, a DVD-RW, DVD+RW, magnetic tape, a non-volatile memory card, and a ROM. Alternatively, the program code may be downloaded over a network.

The present invention further includes implementing the functions of the above embodiments by executing program code read by the computer. In addition, according to another embodiment, the present invention also includes implementing the functions of the above embodiments by executing part or all of the actual process by an operating system (OS) that operates on the computer in accordance with the instruction of the program code.

Furthermore, the present invention also includes implementing the functions of the above embodiments by the following processing. That is, writing program code read from a storage medium into a memory of a function expansion board inserted into the computer or a function expansion unit connected to the computer, and thereafter, executing part or all of actual processing by the CPU or the like of the function expansion board or the function expansion unit in accordance with the instruction of the program code.

According to the various embodiments described above, an image processing apparatus that executes storage processing is determined on the basis of device information on a plurality of image processing apparatuses that execute collaborative operation, and the determined image processing apparatus transfers image data related to the collaborative operation to a storage unit. This allows, in collaborative operation, even an apparatus having no storage processing function to execute storage processing if another apparatus has a storage processing function, thus allowing collaborative operation.

Moreover, since the above embodiments are configured to notify image processing apparatuses other than the determined image processing apparatus not to execute storage processing, duplicated storage processing by the apparatuses can be prevented in collaborative operation. Since it is sufficient only to be able to identify the transmission source of image data, there is no need to store the image data and history data of all the image processing apparatuses related to collaborative processing. Thus, the memory capacity of the storage unit can be used efficiently.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-027804 filed Feb. 7, 2008, which is hereby incorporated by reference herein in its entirety.

What is claimed is:

1. An image storage system comprising:
a plurality of image processing apparatuses that execute collaborative multifunction image processing on image data in collaboration with one another to generate collaborative result data that includes collaborative history data, the collaborative multifunction image processing including a first image processing function performed by a first one of the image processing apparatuses and a second image processing function performed by a second one of the image processing apparatuses, the first image processing function being different than the second image processing function, the first image processing apparatus being different than the second image processing apparatus, each image processing apparatus implemented using at least one respective micro-processor;
a storage unit, implemented using at least one non-transitory storage medium, that is shared by at least two of the image processing apparatuses and that stores information on the image data;
a plurality of transmitting units, each transmitting unit implemented by a respective one of the image processing apparatuses, for transmitting the information on the image data to the storage unit;
an information acquisition unit that is implemented by a master one of the image processing apparatuses and that acquires apparatus information on the plurality of image processing apparatuses; and
a determination unit that is implemented by the master one of the image processing apparatuses and that determines, based on the acquired apparatus information, at least one of the image processing apparatuses to transmit the collaborative result data to the storage unit, wherein each of the image processing apparatuses engaged in the collaborative multifunction image processing terminates the collaborative multifunction image processing of its own respective portion of the collaborative multifunction image processing, and wherein the master one of the image processing apparatuses controls which of the transmitting units transmits the collaborative result data to the storage unit based on the determination by the determination unit.

2. The image storage system according to claim 1, further comprising:
a notification unit that notifies those of the image processing apparatuses other than the image processing apparatus determined by the determination unit not to transmit the collaborative result data to the storage unit.

3. The image storage system according to claim 1, wherein the transmitting unit that transmits the collaborative result data to the storage unit further transmits history information on the image processing on the image data to the storage unit.

4. The image storage system according to claim 1, wherein the image acquisition unit acquires the apparatus information before the plurality of image processing apparatuses execute the collaborative multifunction image processing on the image data in collaboration with one another.

5. The image storage system according to claim 1, wherein
the apparatus information includes information indicating whether the image processing apparatuses have one of the transmitting units; and
the determination unit determines, from the plurality of image processing apparatuses, an image processing apparatus to transmit the collaborative result data to the storage unit based on the information indicating whether the image processing apparatuses has one of the transmitting units.

6. The image storage system according to claim 1, wherein
the apparatus information includes information indicating the remaining memory capacities of the image processing apparatuses; and
the determination unit determines, from the plurality of image processing apparatuses, an image processing apparatus having the highest remaining memory capacity to be an image processing apparatus that transmits the collaborative result data to the storage unit.

7. The image storage system according to claim 1, wherein
the apparatus information includes information indicating the time required for the at least one of the transmitting units to transmit the collaborative result data to the storage unit; and
the determination unit determines, from the plurality of image processing apparatuses, an image processing apparatus that takes the shortest time to be an image processing apparatus that transmits the collaborative result data to the storage unit.

8. The image storage system according to claim 1, wherein
the apparatus information includes identifying information that identifies the storage unit; and
in the case where the identifying information differs among the plurality of image processing apparatuses, the determination unit determines that all of the plurality of image processing apparatuses transmit the collaborative result data to a storage unit identified by the identifying information.

9. The image storage system according to claim 1, wherein
the apparatus information includes description of collaborative multifunction image processing executed on the image data by a subsequent image processing apparatus; and
the determination unit determines, from the plurality of image processing apparatuses, an image processing apparatus that transmits the collaborative result data to the storage unit based on the description of the processing executed by the subsequent image processing apparatus.

10. A master image processing apparatus that executes collaborative multifunction image processing on image data in collaboration with another image processing apparatus to generate collaborative result data that includes collaborative history data, the collaborative multifunction image processing including a first image processing function performed by the master image processing apparatuses and a second image processing function performed by the other image processing apparatus, the first image processing function being different than the second image processing function, the master image processing apparatus comprising:
a receiving unit that is implemented using at least one micro-processor and that receives apparatus information on the other image processing apparatus;
a transmitting unit that is implemented by the at least one micro-processor and that is configured for transmitting the collaborative result data to a storage unit that is shared by the image processing apparatuses, the storage unit implemented using at least one non-transitory storage medium; and
a determination unit that is implemented by the at least one micro-processor and that determines whether the collaborative result data is to be transmitted to the storage unit by its own transmitting unit or rather by the other image processing apparatus, wherein
each of the image processing apparatuses engaged in the collaborative multifunction image processing terminates the collaborative multifunction image processing of its own respective portion of the collaborative multifunction image processing, and wherein the master image processing apparatus controls which of the image processing apparatuses transmits the collaborative result data to the storage unit based on the determination by the determination unit.

11. The image processing apparatus according to claim 10, further comprising:
a notification unit that notifies the other image processing apparatus, in the case where the determination unit determines that the collaborative result data is to be transmitted by its own transmitting unit, not to transmit the collaborative result data to the storage unit.

12. The image processing apparatus according to claim 11, wherein
in the case where the determination unit determines that the collaborative result data is to be transmitted by the other image processing apparatus, the notification unit notifies the other image processing apparatus to transmit the collaborative result data to the storage unit.

13. The image processing apparatus according to claim 10, wherein
in the case where the determination unit determines that the collaborative result data is to be transmitted by the image processing apparatus and the other image processing apparatus, the notification unit notifies the other image processing apparatus to transmit the collaborative result data to the storage unit.

14. The image processing apparatus according to claim 10, wherein
in the case where the determination unit determines that the collaborative result data is to be transmitted by neither the image processing apparatus nor the other image processing apparatus, the notification unit notifies the other image processing apparatus not to execute collaborative multifunction image processing on the image data in collaboration with the image processing apparatus.

15. A master image processing apparatus that executes collaborative multifunction image processing on image data in collaboration with another image processing apparatus to generate collaborative result data that includes collaborative history data, the collaborative multifunction image processing including a first image processing function performed by the master image processing apparatuses and a second image processing function performed by the other image processing apparatus, the first image processing function being different than the second image processing function, the master image processing apparatus comprising:
a transmitting unit that is implemented using at least one micro-processor and that transmits apparatus information on the image processing apparatus to the other image processing apparatus;
a receiving unit that is implemented using at least one micro-processor and that receives, from the other image processing apparatus, a notification on processing of transmitting the image data to a storage unit that is shared by the image processing apparatuses, the storage unit implemented using at least one non-transitory storage medium; and a determination unit that is implemented using at least one micro-processor and that determines whether to transmit the collaborative result data to the storage unit based on the notification that the receiving unit has received, wherein each of the image processing apparatuses engaged in the collaborative multifunction image processing terminates the collaborative multifunction image processing of its own respective portion of the collaborative multifunction image processing, and wherein the master image processing apparatus controls whether any of the image processing apparatuses transmits the collaborative result data to the storage unit based on the determination by the determination unit.

16. An image storage method of an image processing system including a plurality of image processing apparatuses that execute collaborative multifunction image processing on image data in collaboration with one another to generate collaborative result data that includes collaborative history data, the collaborative multifunction image processing including a first image processing function performed by a first one of the image processing apparatuses and a second image processing function performed by a second one of the image processing apparatuses, the first image processing function being different than the second image processing function, the first image processing apparatus being different than the second image processing apparatus, each of the image processing apparatuses implemented using at least one respective micro-processor, one of the image processing apparatuses serving as a master image processing apparatus, the method using a storage unit shared by at least two of the image processing apparatuses and implemented using at least one non-transitory storage medium, the method comprising:

acquiring, at the master image processing apparatus, apparatus information on the plurality of image processing apparatuses;

determining using the master image processing apparatus, based on the acquired apparatus information, an image processing apparatus to transmit the collaborative result data to the storage unit based on the acquired apparatus information; and transmitting the collaborative result data to the storage unit by the determined image processing apparatus, wherein each of the image processing apparatuses engaged in the collaborative multifunction image processing terminates the collaborative multifunction image processing of its own respective portion of the collaborative multifunction image processing, and wherein the master image processing apparatus controls the determined image processing apparatus to cause the determined image processing apparatuses to transmit the collaborative result data to the storage unit.

17. An image storage method of a master image processing apparatus that executes collaborative multifunction image processing on image data in collaboration with another image processing apparatus to generate collaborative result data that includes collaborative history data, the collaborative multifunction image processing including a first image processing function performed by the master image processing apparatuses and a second image processing function performed by the other image processing apparatus, the first image processing function being different than the second image processing function, each of the image processing apparatuses implemented using at least one respective micro-processor, the method using a storage unit shared by the image processing apparatuses and implemented using at least one non-transitory storage medium, the method comprising:

receiving apparatus information on the other image processing apparatus;

determining, based on the received apparatus information, whether the collaborative result data is to be transmitted to a storage unit by the master image processing apparatus or rather by the other image processing apparatus;

in the case where it is determined that the collaborative result data is to be transmitted by the master image processing apparatus, having the master image processing apparatus transmit the collaborative result data to the storage unit; and in the case where it is determined that the collaborative result data is to be transmitted by the other image processing apparatus, having the other image processing apparatus transmit the collaborative result data to the storage unit, wherein each of the image processing apparatuses engaged in the collaborative multifunction image processing terminates the collaborative multifunction image processing of its own respective portion of the collaborative multifunction image processing, and wherein the master information processing apparatus controls which of the image processing apparatuses transmits the collaborative result data to the storage unit based on the determination.

18. An image storage method of a master image processing apparatus that executes collaborative multifunction image processing on image data in collaboration with another image processing apparatus to generate collaborative result data that includes collaborative history data, the collaborative multifunction image processing including a first image processing function performed by the master image processing apparatuses and a second image processing function performed by the other image processing apparatus, the first image processing function being different than the second image processing function, each of the image processing apparatuses implemented using at least one respective micro-processor, the method using a storage unit shared by the image processing apparatuses and implemented using at least one non-transitory storage medium, the method comprising:

transmitting apparatus information on the master image processing apparatus to the other image processing apparatus;

receiving a notification on processing of transmitting the collaborative result data to the storage unit from the other image processing apparatus; and determining which of the image processing apparatuses is to be used to transmit the collaborative result data to the storage unit based on the notification received by the receiving unit, wherein each of the image processing apparatuses engaged in the collaborative multifunction image processing terminates the collaborative multifunction image processing of its own respective portion of the collaborative multifunction image processing, and wherein the master image processing apparatus controls which of the image processing apparatuses transmits the collaborative result data to the storage unit based on the determination.

19. A non-transitory machine readable storage medium that stores a program executable by the machine for executing an image storage method of a master image processing apparatus that executes collaborative multifunction image processing on image data in collaboration with another image processing apparatus to generate collaborative result data that includes collaborative history data, the collaborative multifunction image processing including a first image processing function performed by the master image processing apparatuses and a second image processing function performed by the other image processing apparatus, the first image processing function being different than the second image processing function, the image storage method using a storage unit shared by the image processing apparatuses and implemented using at least one non-transitory storage medium, the image storage method comprising:

receiving, at the master image processing apparatus, apparatus information on the other image processing apparatus;

determining using the master image processing apparatus, based on the received apparatus information, whether the collaborative result data is to be transmitted to a storage unit by the master image processing apparatus or rather by the other image processing apparatus, the storage unit implemented using at least one non-transitory storage medium;

in the case where it is determined that the collaborative result data is to be transmitted by the master image processing apparatus, having the master image processing apparatus transmit the collaborative result data to the storage unit; and in the case where it is determined that the collaborative result data is to be transmitted by the other image processing apparatus, having the other image processing apparatus transmit the collaborative result data to the storage unit, wherein each of the image processing apparatuses engaged in the collaborative multifunction image processing terminates the collaborative multifunction image processing of its own respective portion of the collaborative multifunction image processing, and wherein the master information processing apparatus controls which of the image processing apparatuses transmits the collaborative result data to the storage unit based on the determination.

20. A non-transitory machine readable storage medium that stores a program executable by the machine for executing an image storage method of a master image processing apparatus that executes collaborative multifunction image processing on image data in collaboration with another image processing apparatus to generate collaborative result data that includes collaborative history data, the collaborative multifunction image processing including a first image processing function performed by the master image processing apparatuses and a second image processing function performed by the other image processing apparatus, the first image processing function being different than the second image processing function, the image storage method using a storage unit shared by the image processing apparatuses and implemented using at least one non-transitory storage medium, the image storage method comprising:

transmitting, by the master image processing apparatus, apparatus information on the master image processing apparatus to the other image processing apparatus;

receiving at the master image processing apparatus a notification on the processing of transmitting the collaborative result data to a storage unit from the other image processing apparatus; and determining, by the master image processing apparatus, whether to transmit the collaborative result data to the storage unit based on the notification received by the receiving unit, wherein each of the image processing apparatuses engaged in the collaborative multifunction image processing terminates the collaborative multifunction image processing of its own respective portion of the collaborative multifunction image processing, and wherein the master image processing apparatus controls whether any of the image processing apparatuses transmits the collaborative result data to the storage unit based on the determination.

\* \* \* \* \*